April 26, 1966 W. D. CHAMBERS ET AL 3,247,840
SOLAR ENERGY COLLECTOR MEANS
Filed June 7, 1963 2 Sheets-Sheet 1
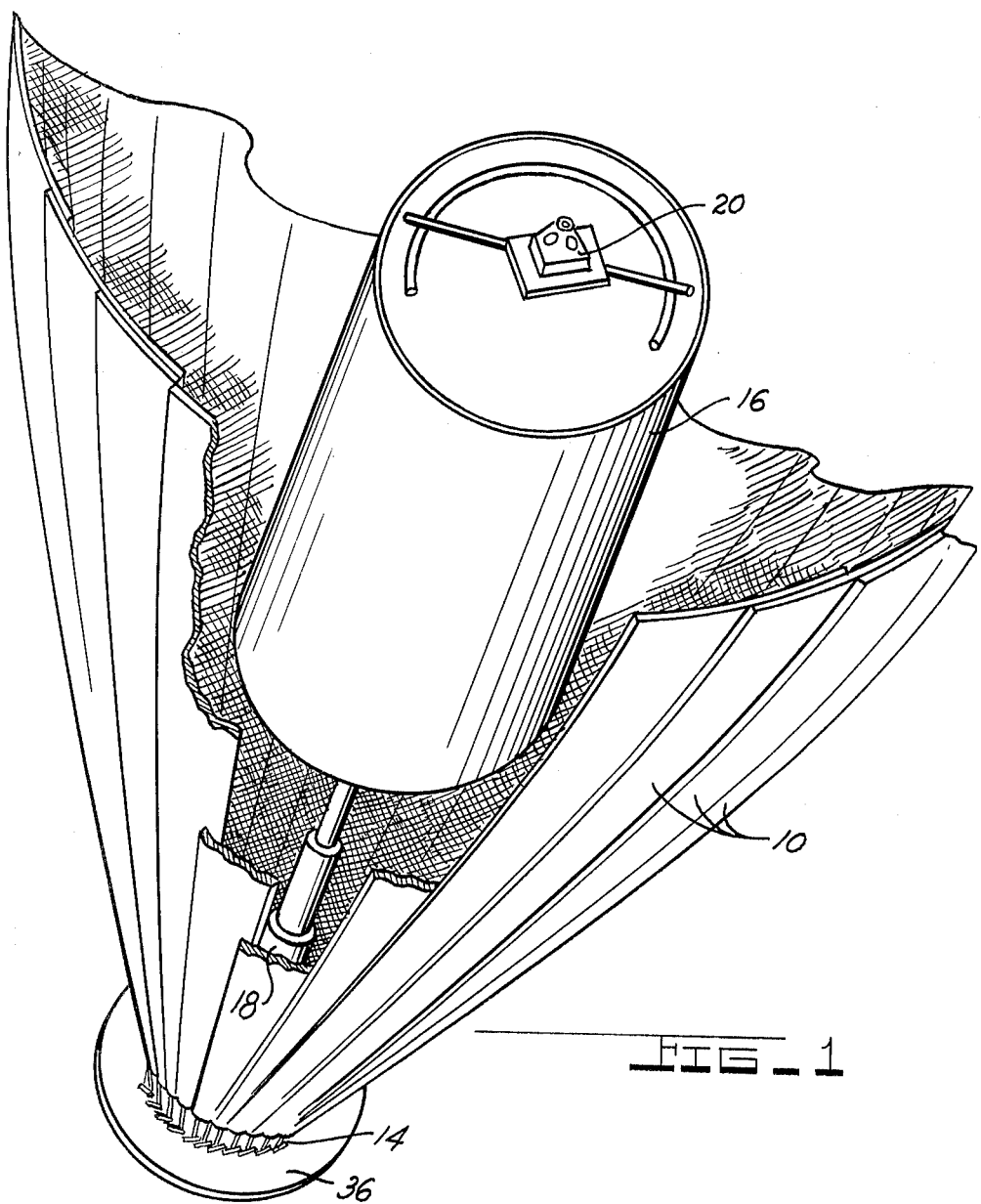
FIG_1
INVENTORS.
WARREN D. CHAMBERS.
GERARD P. DEYERLING.
BY-
Richard G. Geib
ATTORNEY.

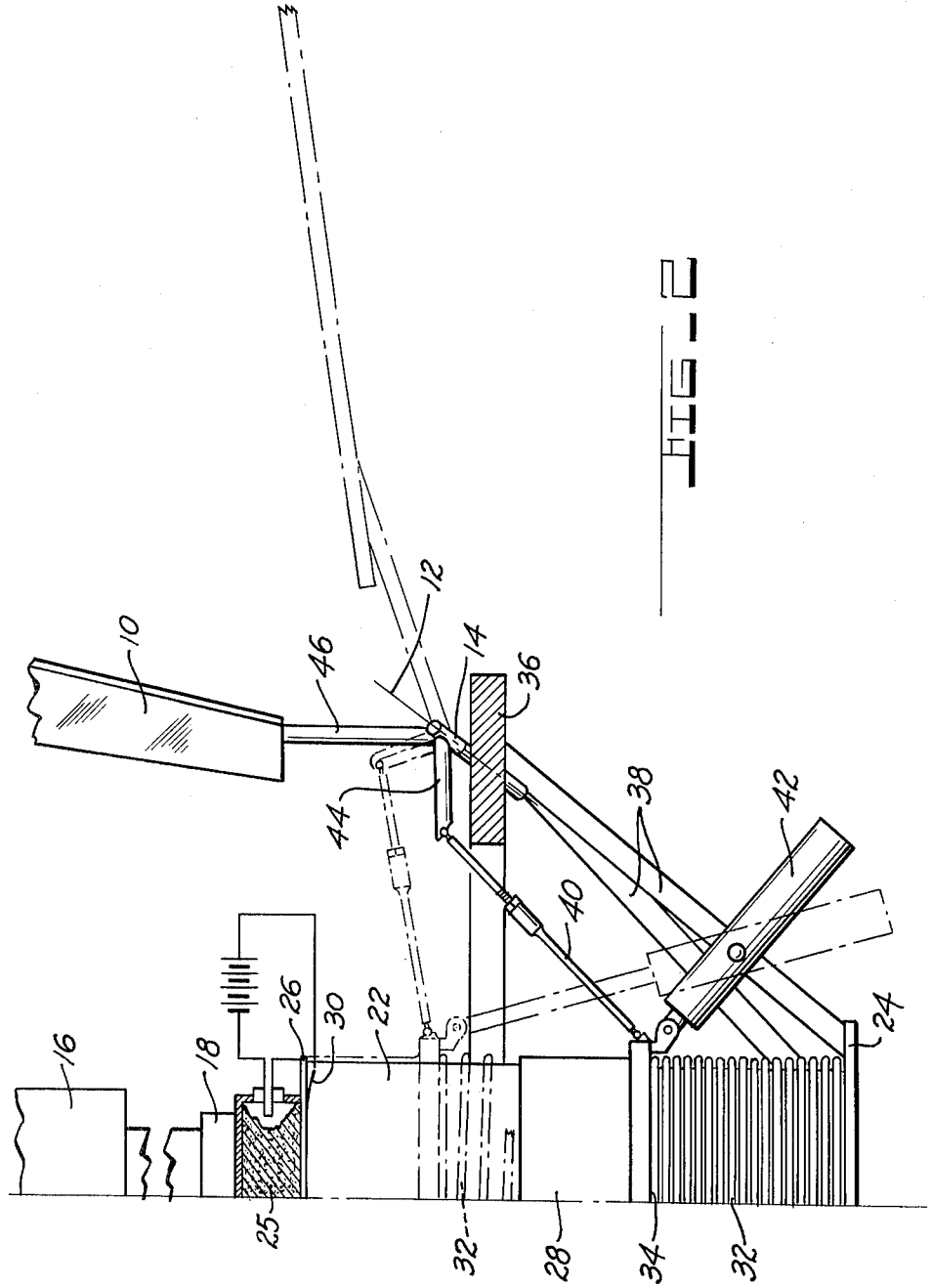

United States Patent Office 3,247,840
Patented Apr. 26, 1966

3,247,840
SOLAR ENERGY COLLECTOR MEANS
Warren D. Chambers and Gerard P. Deyerling, South Bend, Ind., assignors to The Bendix Corporation, South Bend, Ind., a corporation of Delaware
Filed June 7, 1963, Ser. No. 286,413
4 Claims. (Cl. 126—270)

This invention relates to a portable solar energy collector and heat absorbing means.

The emergency of space vehicles as a major national technical effort has posed a challenge to the suppliers of systems and components for existing flight vehicles. New and critically stringent requirements have brought pressure for new and ingenious answers to these problems. One of these problems has been in the designing of a self contained solar energy type power plant which would have an adequately sized collector or mirror to provide the maximum power. Obviously, the collector or mirror would have to be such as to not interfere with vehicle reaching launch and escape velocity in the earth's atmosphere. In space a large frontal area would not be a problem. Therefore, we have devised a collector and heat absorbing unit which is storable in a small cylindrical shell or configuration and which can be automatically deployed to form a large diameter collector and mirror for a heat absorber which is also automatically projected to the focal point for the mirror.

It is therefore a principal object of this invention to provide a folding mechanism for a solar collector or mirror and an extending means for a heat absorber which is simple, reliable, of light weight, and accurate in concentrating the highest possible percentage of energy.

A further object of our invention is to provide a simple unfolding mechanism without sequencing switches, motors, etc.

A still further object of our invention is to provide a mirror of a plurality of plates or petals which will lie adjacent when substantially vertical.

It is also an object of our invention to provide a solar powerplant as an integral assembly without moving joints or flexible lines in the powerplant working fluid circuit.

Other and further objects and advantages of our invention will appear from the following description of the accompanying drawings in which:

FIGURE 1 is an isometric drawing with a portion of the petals broken away to show the arrangement of the petals and heat absorber during the first stages of deployment; and FIGURE 2 is a side, sectional view of the petal and absorber mounting structure.

With more particular regard to the drawings, especially FIGURE 1, I show a plurality of petals or mirror segments 10 partially rotated about an axis 12 (see FIGURE 2) of a bell crank or similar type connecting means 14 from the vertical condition where the edge width of the segments is disposed radially. As seen, a heat absorber 16 is mounted to a telescoping tube assembly 18 centrally of the segments 10. A positioning control mechanism 20 placed, as seen, on the forward end of the powerplant provides control signals for maintaining the deployed mirror petals 10 toward the sun. Such a control forms no part of this invention and is essentially a thermostatic control familiar to practitioners in the solar energy field.

The segments 10 and the telescoping tube 18 are mounted to a tubular base structure 22 having a flange 24 and a forward stop 26. (See FIGURE 2.) A collar 28 is adapted to reciprocate between the flange and stop on the tube 22. In addition, a switch 30 is placed on stop 26 such that the collar 28 will close same upon abutting the stop for reasons explained hereinafter. A large compression spring 32 is placed about the tube 22 between a rear portion 34 of collar 28 and the front face of flange 24. About the tubular structure 22, we have placed a ring 36 and have joined the ring to flange 24 by angle braces 38. The ring 36 mounts the bellcranks 14 at an angle to both the horizontal and vertical planes passing through the ring.

We connect the collar to the bellcrank 14 by an adjustable link or rod 40, there being an individual link for each segment in order to adjust the respective petal or segment to lie collinear with surrounding petals and to enable folding without contact of petals that would tend to deteriorate the mirror surface.

With reference to FIGURE 2, we show a conventional snubber 42 pivotally connected to one of the drag braces 38 and to the rear portion 34 of the collar 28. This will prevent abrupt impact of the collar 28 on stop 26, and the snubber will absorb shock loads applied to petals 10 as by flying objects, etc.

In operation, the petals 10 are collected in a vertical or folded manner, and a strap (not shown) is placed around the periphery of the folded petals and releasably locked, as by an explosive type connector. This presents a small cylindrical configuration.

When it is desired to deploy the mirror, the explosive connector (not shown) is activated to release the petals 10. Thereafter the spring 32 will thrust the collar outwardly to the position shown in phantom in FIGURE 2. The links 40 rotate crank 14 about axis 12 to rotate the petals or segments 10 about their axis and at the same time flatten the petals to a substantially horizontal position. This rotation may be varied by changing the angle of axis 12 or by changing the angle of arm 44 as respects the petal root end 46.

As the collar 28 closes switch 30 by abutting with stop 26, a squib may be ignited by closing the electrical circuit thereto as generally seen in FIGURE 2 to activate an explosive charge within the telescoping tube 18 adjacent the flange 26 on the base structure 22 that expands tube 18. This will locate the heat absorber 16 at the focal point of the deployed mirror segments 10.

In order to minimize weight, we can in place of the explosive charge 25 above described use an air cylinder with compressed air within the tube 22 to project the collar 28 and simultaneously extend the heat absorber 16.

While we have particularly described the invention above, we do not intend such to be a limitation. Instead it is our intent to set forth the true scope of our invention by the following claims.

We claim.

1. A means for deploying a solar collector and heat absorber, said means comprising:
   a mounting structure including a tubular structure having a flange at one end thereof and a ring with a supporting network joining said structure and said ring in a radially spaced relationship;
   an annular collar adapted to reciprocate along said tubular structure forwardly of the flange thereon and within the space between said tubular structure and said ring;
   a plurality of connecting means rotatably mounted on said ring at a compound angle such that an axis of rotation of said connecting means is at a preselected angle with a vertical plane and a horizontal plane passing through said ring;
   a plurality of adjustable link means joining said collar with said connecting means;
   a plurality of mirror segments each having a free end and an end affixed to each of said connecting means;
   a telescoping tube attached to said tubular structure;
   a force producing means to project said collar and said link means to rotate said connecting means about the axis of rotation to radially deploy said mirror segments;

a switch means operatively connected to said tubular structure and arranged to be actuated by said annular collar when said mirror segments have been fully deployed; and a means for generating pressure to project said telescoping tube from said tubular structure which means for generating pressure is responsive to actuation of said switch means.

2. A means for deploying a solar collector comprising:

a solar heat absorber;

a mounting means including a tubular member having a flange on the lower extremity thereof and a stop means spaced from said flange and a ring member coaxially arranged with respect to said tubular member and mounted to said tubular member by a supporting brace means affixed to the flange of said tubular member and to said ring;

an annular collar reciprocally mounted to said tubular member between said stop means and said flange;

a plurality of bell cranks each being rotatably mounted on said ring at a compound angle such that an axis of rotation of each bell crank is at a preselected angle with both a vertical plane and a horizontal plane passing through said ring;

a plurality of adjustable links having spherical ends with one end connected to a respectvie bell crank and the other end affixed to said collar by ball and socket type connections;

a plurality of pie-shaped petals each having a root end in the form of a tubular member whose axis corresponds to the petal axis, each of said root ends being joined individually to said bell cranks such that reciprocation of said collar and resultant projection of said adjustable link means rotates each of said bell cranks to rotate said petals from a normally substantially vertical attitude to a deployed, substantially horizontal attitude;

a spring operatively connecting said collar with said flange of said tubular member and normally compressed when said petals are in the substantially vertical attitude such that said spring will reciprocate said collar away from said flange to bring about the deployment of said petals to the substantially horizontal attitude;

a switch means operatively connected to said tubular structure and arranged to be actauted by said collar when said collar has reached a limit of reciprocation as forced by said spring;

a telescoping tube mounted to said tubular member in front of said stop means, said tube mounting said heat absorber at its end opposite that connecting with said tubular member; and an actuator means operatively connected to said telescoping tube and controlled by said switch means to project said heat absorber from said tubular member to a point in space which is a focal point for the petals when they are in their deployed, substantially horizontal attitude.

3. A means for deploying a solar collector and heat absorber according to claim 2 and further comprising a snubber operatively connected to the annular collar and the supporting brace to prevent abrupt abutment of said collar on said stop means and to absorb impact loads on the deployed petals.

4. A means for deploying a solar collector and heat absorber according to claim 2 and further comprising a means to hold said petals in a substantially vertical condition with said collar compressing said spring against said flanged base, said holding means having provision for releasing said petals to allow said spring to deploy them.

References Cited by the Examiner

UNITED STATES PATENTS

| | | | |
|---|---|---|---|
| 2,674,693 | 4/1954 | Millett et al. | 343—915 X |
| 2,909,171 | 10/1959 | Lof | 126—270 |
| 3,064,534 | 11/1962 | Tumavicus | 126—270 X |
| 3,105,486 | 10/1963 | Glenn | 126—270 |
| 3,109,608 | 11/1963 | Boehm et al. | 126—270 X |

FREDERICK L. MATTESON, JR., *Primary Examiner.*

JAMES W. WESTHAVER, *Examiner.*